H. W. WHITE.
Vine Trimmer.

No 106,437.

Patented Aug. 16, 1870.

WITNESSES:
P. C. Dieterich
L. S. Mabee

INVENTOR:
H. W. White
per Munn & Co
ATTORNEYS.

United States Patent Office.

HARRISON W. WHITE, OF JOPPA VILLAGE, MASSACHUSETTS.

Letters Patent No. 106,437, dated August 16, 1870.

IMPROVEMENT IN VINE-CUTTER AND TRIMMER.

The Schedule referred to in these Letters Patent and making part of the same.

To all whom it may concern:

Be it known that I, HARRISON W. WHITE, of Joppa Village, in the county of Plymouth and State of Massachusetts, have invented a new and useful Improvement in Vine-Cutter or Trimmer; and I do hereby declare that the following is a full, clear, and exact description thereof, which will enable others skilled in the art to make and use the same, reference being had to the accompanying drawing forming part of this specification, in which—

Similar letters of reference indicate corresponding parts.

Figure 1:
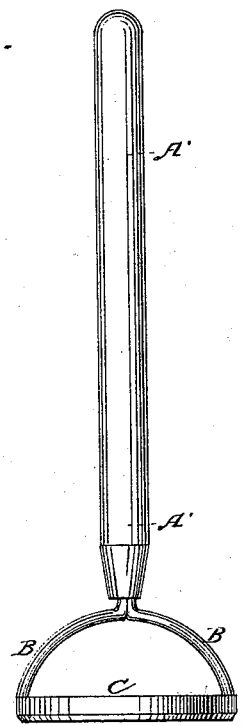
Figure 1 is a side view of my improved vine-trimmer.
Figure 2:
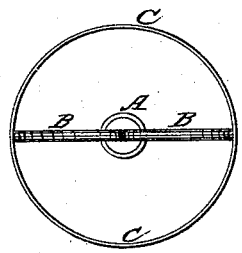
Figure 2 is a face view of the same.

My invention has for its object to furnish an improved implement for cutting or trimming the runners from strawberry vines planted in hills, which shall be so constructed as to cut off all the runners from the hill at a single operation, and which shall, at the same time, be simple in construction, effective in operation, and conveniently operated; and It consists in the cutter or trimmer constructed and operating substantially as hereinafter more fully described.

A is the handle, which may be made of any convenient length.

To the lower end of the handle A is attached, or upon it is formed, a forked arm B, to the lower ends of the forks of which is attached a circular knife or band, C, the lower edge of which is sharpened, and which is made of such a size that it may receive the hill of plants within it, so that when forced down around said hill, it may cut off all the runners at a single operation.

The knife or band C may be made in a solid circle, or it may be made in sections, so that it may be contracted or expanded to adjust it to the different growth of the plants; or, if desired, the knife or cutter C may be made in the form of a semicircle.

Having thus described my invention,

I claim as new and desire to secure by Letters Patent—

An improved vine-trimmer or cutter, consisting of the handle A, forked arm B, and knife or cutter C, whether said knife be made solid in one piece or in sections, and whether it be an entire circle or a semicircle, substantially as herein shown and described, and for the purpose set forth.

HARRISON W. WHITE.

Witnesses:
WM. F. PRATT,
GEORGE ALLEN.